United States Patent
Mukherjee et al.

(10) Patent No.: US 12,217,190 B2
(45) Date of Patent: Feb. 4, 2025

(54) DECISION MAKING USING INTEGRATED MACHINE LEARNING MODELS AND KNOWLEDGE GRAPHS

(71) Applicant: Bank of America Corporation, Charlotte, NC (US)

(72) Inventors: Maharaj Mukherjee, Poughkeepsie, NY (US); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1007 days.

(21) Appl. No.: 17/166,087

(22) Filed: Feb. 3, 2021

(65) Prior Publication Data

US 2022/0245469 A1    Aug. 4, 2022

(51) Int. Cl.
*G06N 20/00* (2019.01)
*G06N 5/022* (2023.01)

(52) U.S. Cl.
CPC ............. *G06N 5/022* (2013.01); *G06N 20/00* (2019.01)

(58) Field of Classification Search
CPC .......... G06N 5/022; G06N 20/00; G06N 5/04; G06N 5/02
See application file for complete search history.

(56) References Cited

U.S. PATENT DOCUMENTS

| | | | |
|---|---|---|---|
| 10,311,050 B2 | 6/2019 | Beller et al. | |
| 10,349,134 B2 | 7/2019 | Hamiti et al. | |
| 10,474,949 B2 | 11/2019 | Majumdar et al. | |
| 10,489,982 B2 | 11/2019 | Johnson et al. | |
| 10,496,678 B1 | 12/2019 | Tang | |
| 10,565,508 B2 | 2/2020 | Merdivan et al. | |
| 10,586,156 B2 | 3/2020 | Merdivan et al. | |
| 10,599,983 B2 | 3/2020 | Merdivan et al. | |
| 10,606,849 B2 | 3/2020 | Beller et al. | |
| 10,607,142 B2 | 3/2020 | Beller et al. | |
| 10,614,086 B2 | 4/2020 | Tung et al. | |
| 10,621,368 B2 | 4/2020 | Ravizza et al. | |
| 10,679,007 B2 | 6/2020 | Jia et al. | |
| 10,725,982 B2 | 7/2020 | Scheideler et al. | |
| 10,762,083 B2 | 9/2020 | Firooz et al. | |
| 10,762,113 B2 | 9/2020 | Jia et al. | |
| 10,803,394 B2 | 10/2020 | Costabello et al. | |

(Continued)

*Primary Examiner* — Hope C Sheffield
(74) *Attorney, Agent, or Firm* — Banner & Witcoff, Ltd.

(57) ABSTRACT

Aspects of the disclosure relate to machine learning models and knowledge graphs. A computing platform may receive event processing data. Using a machine learning mode, the computing platform may identify k nearest data points corresponding to the event processing data. Using a knowledge graph, the computing platform may identify k nearest data nodes corresponding to the event processing data. The computing platform may generate first weighted relative distances between the event processing data and the k nearest data points, and second weighted relative distances between the event processing data and the k nearest data nodes. Based on the weighted relative distances, the computing platform may identify a data cluster for the event processing data. The computing platform may send, based on the identified data cluster, event processing information and one or more commands directing an enterprise computing device to display the event processing information.

20 Claims, 9 Drawing Sheets

(56) References Cited

U.S. PATENT DOCUMENTS

| | | |
|---|---|---|
| 10,824,675 B2 | 11/2020 | Alonso et al. |
| 10,902,203 B2 | 1/2021 | Patra et al. |
| 10,909,441 B2 | 2/2021 | Gao et al. |
| 10,909,494 B2 | 2/2021 | Lecue et al. |
| 2015/0142807 A1* | 5/2015 | Hofmann ............... G06N 3/044 |
| | | 707/759 |
| 2017/0161619 A1* | 6/2017 | Franceschini .......... G06N 5/022 |
| 2019/0294920 A1* | 9/2019 | Kandaswamy ........ G06V 10/75 |
| 2019/0317965 A1* | 10/2019 | Remis ................. G06F 16/3322 |
| 2019/0378010 A1* | 12/2019 | Morris ................. G06F 16/288 |
| 2020/0226213 A1 | 7/2020 | Freed et al. |
| 2020/0342462 A1 | 10/2020 | Todd et al. |

\* cited by examiner

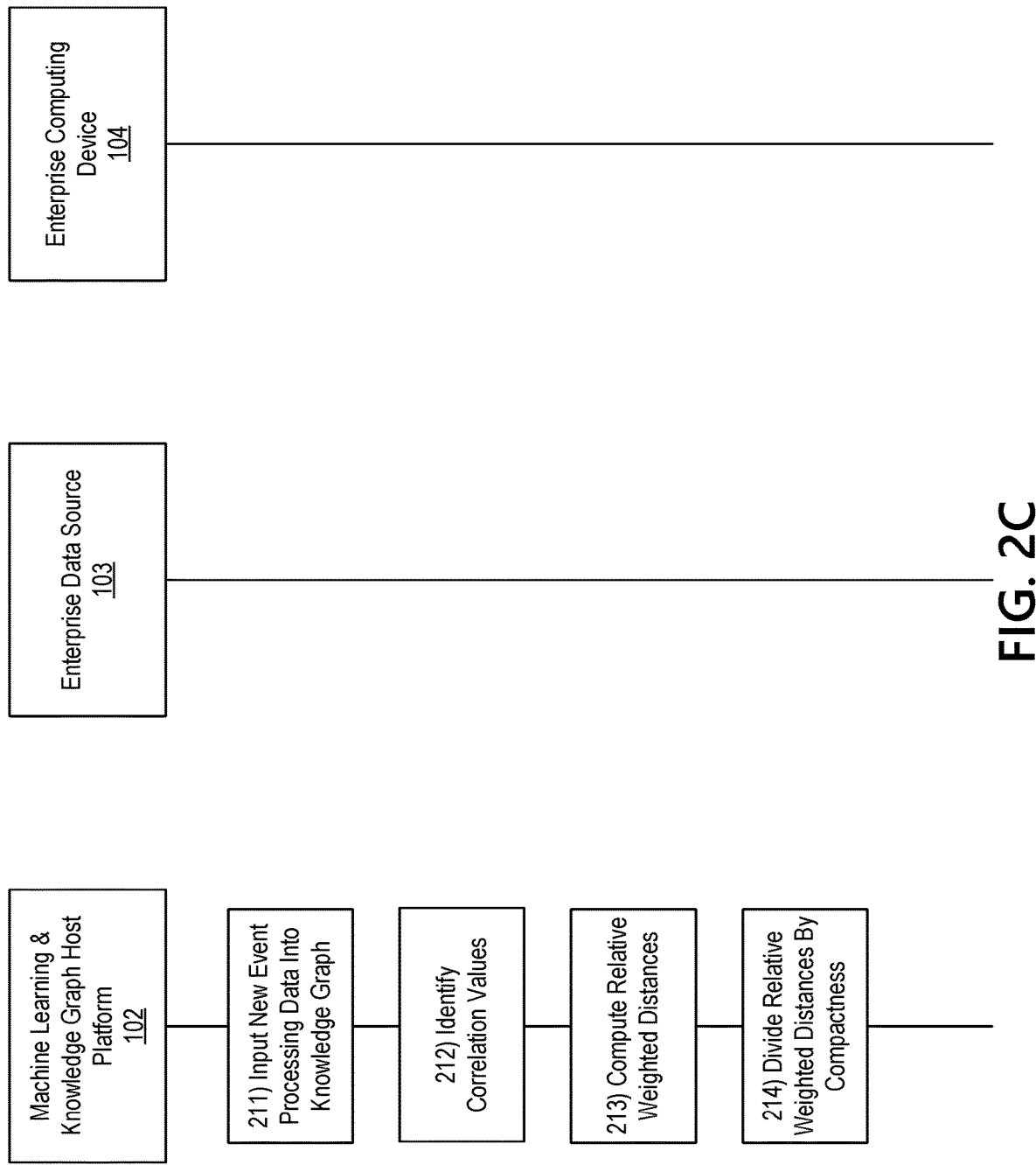

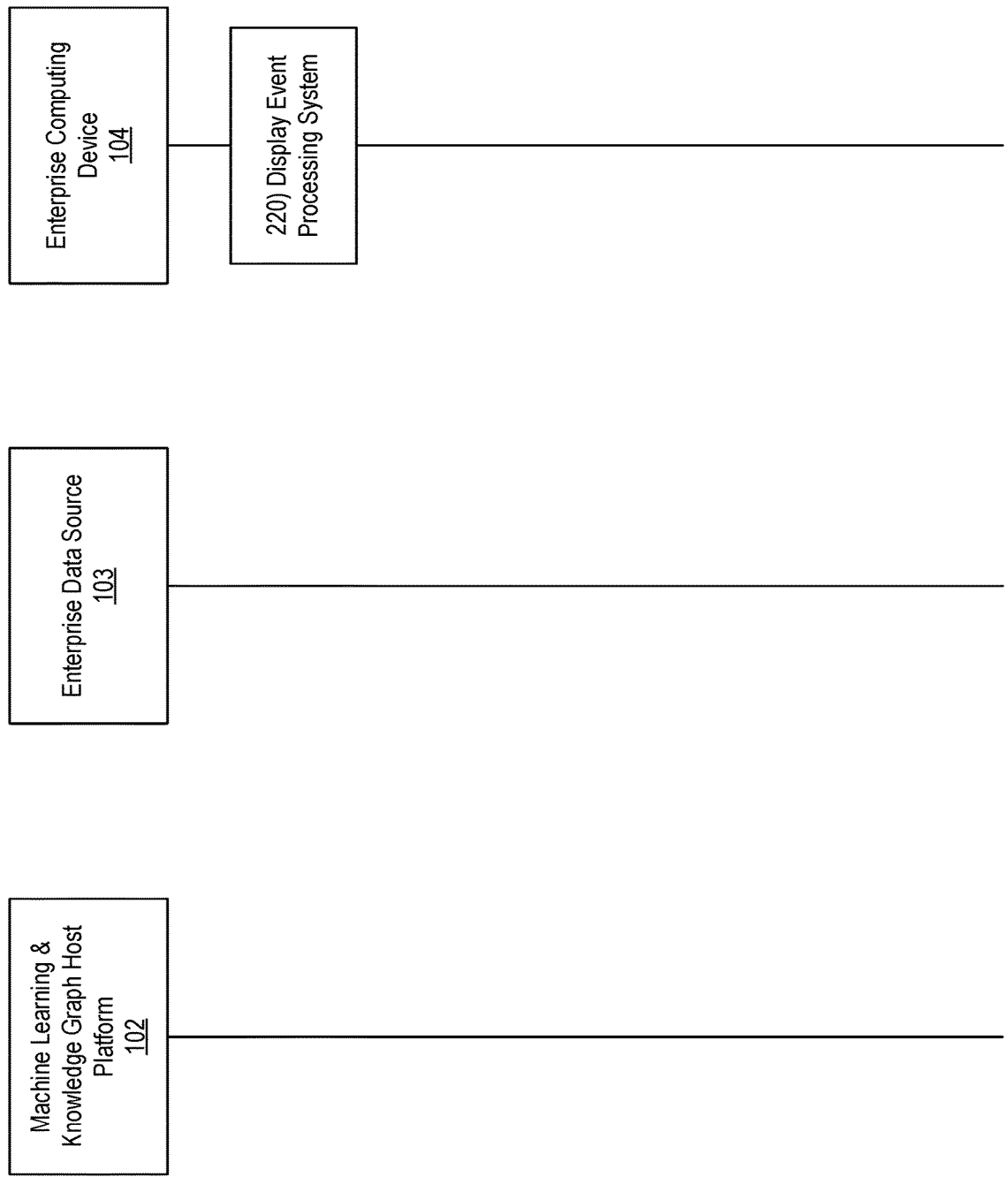

DECISION MAKING USING INTEGRATED MACHINE LEARNING MODELS AND KNOWLEDGE GRAPHS

BACKGROUND

Aspects of the disclosure relate to machine learning models and knowledge graphs. In particular, one or more aspects of the disclosure relate to improving accuracy of hybrid machine learning and knowledge graph decision making.

In some instances, machine learning models may be implemented to make automated predictions based on one or more sets of training data. In other instances, knowledge graphs may implemented to make automated predictions based on one or more sets of training data. In different instances, machine learning models may offer more accurate results than knowledge graphs and vice versa. Accordingly, there may be instances in which knowledge graphs and machine learning models may both be separately applied to a set of data, and the result with a more accurate confidence level may be selected. However, if the resulting confidence levels are similar, the results might not be distinguishable. Similarly, by selecting one result over the other, the results of the non-selected prediction method (e.g., the machine learning or the knowledge graph) may be merely discarded, which may reduce the accuracy of such predictions (because information produced by the non-selection prediction method may be ignored), and may result in operational inefficiencies in the use of machine learning models and knowledge graphs.

SUMMARY

Aspects of the disclosure provide effective, efficient, scalable, and convenient technical solutions that address and overcome the technical problems associated with leveraging and combining information from both machine learning models and knowledge graphs in automated decision making. In accordance with one or more embodiments of the disclosure, a computing platform comprising at least one processor, a communication interface, and memory storing computer-readable instructions may receive new event processing data. The computing platform may identify, using a machine learning model, k nearest data points corresponding to the new event processing data. Using a knowledge graph, the computing platform may identify k nearest data nodes corresponding to the new event processing data. The computing platform may generate first weighted relative distances between the new event processing data and the k nearest data points. The computing platform may generate second weighted relative distances between the new event processing data and the k nearest data nodes. Based on the first weighted relative distances and the second weighted relative distances, the computing platform may identify a data cluster for the new event processing data. The computing platform may send, based on the identified data cluster, event processing information and one or more commands directing an enterprise computing device to display the event processing information, which may cause the enterprise computing device to display the event processing information.

In one or more instances, the computing platform may train, using historical event processing data, the machine learning model. Using the historical event processing data, the computing platform may generate the knowledge graph.

In one or more instances, the computing platform may generate a correlation matrix, which may include correlation values between Euclidian distances between the data points of the machine learning model and hop distances between nodes of the knowledge graph. In one or more instances, the computing platform may identify the k nearest data points by: 1) inputting, into the machine learning model, the new event processing data, 2) identifying, using the machine learning model, Euclidian distances between the new event processing data and the historical event processing data, 3) ranking the Euclidian distances from smallest to largest, 4) identifying the k smallest Euclidian distances, and 5) identifying the historical event processing data corresponding to the k smallest Euclidian distances.

In one or more instances, the computing platform may generate the first weighted relative distances between the new event processing data and the k nearest data points by: 1) identifying, using the correlation matrix, the correlation values corresponding to the k nearest data points; and 2) multiplying each of the k smallest Euclidian distances by the corresponding correlation values.

In one or more instances, the computing platform may identify the k nearest data nodes, wherein identifying the k nearest data nodes by: 1) inputting, into the knowledge graph, the new event processing data, 2) identifying, using the knowledge graph, a number of hops between the new event processing data and the historical event processing data, 3) ranking the numbers of hops from smallest to largest, 4) identifying the k smallest hop distances, and 5) identifying the historical event processing data corresponding to the k smallest hop distances.

In one or more instances, the computing platform may generate the second weighted relative distances between the new event processing data and the k nearest data nodes by: 1) identifying, using the correlation matrix, the correlation values corresponding to the k nearest data nodes; and 2) multiplying each of the k smallest hop distances by the corresponding correlation values. In one or more instances, the computing platform may identify a first compactness value for the machine learning model and a second compactness value for the knowledge graph by: 1) identifying an average Euclidian distance between data points of the machine learning model and a center of a corresponding data cluster, 2) identifying, based on the average Euclidian distance, the first compactness value, 3) identifying an average number of hops between data nodes of the knowledge graph and a center of a corresponding data cluster, and 4) identifying, based on the average number of hops, the second compactness value.

In one or more instances, the computing platform may identify the data cluster for the new event processing data by: 1) dividing the first weighted relative distances by the first compactness value, resulting in adjusted first weighted relative distances; 2) dividing the second weighted relative distances by the second compactness value, resulting in adjusted second weighted relative distances; 3) generating a ranking list that includes the adjusted first weighted relative distances and the adjusted second weighted relative distances; 4) identifying the smallest adjusted weighted relative distance; and 5) identifying one of: a data point from the machine learning model, or a data node from the knowledge graph corresponding to the smallest adjusted weighted relative distance.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for correlating machine learning models and knowledge graphs for improved decision making in accordance with one or more example embodiments;

DETAILED DESCRIPTION

Figure 1A:
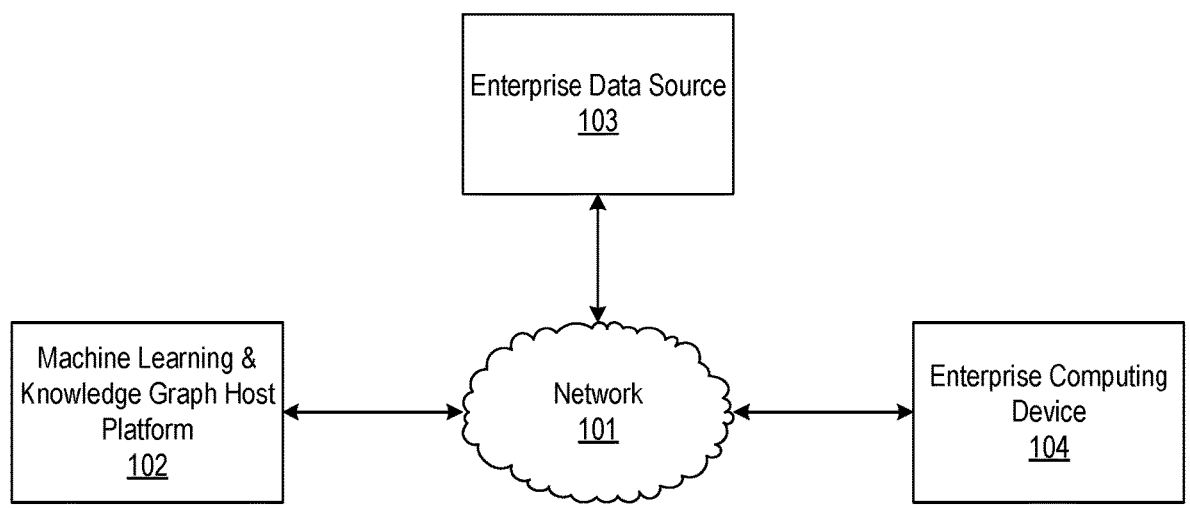
FIGS. 1A-1B depict an illustrative computing environment for correlating machine learning models and knowledge graphs for improved decision making in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a hybrid solution for leveraging both machine learning and knowledge graphs in decision making. For example, machine learning and artificial intelligence may be divided into two broad methods—statistical machine learning and syntactic machine learning. Statistical machine learning may be concerned with automatic discovery of regularities in data through the use of computer algorithms and with the use of these regularities to take actions such as classifying data into different categories. Machine learning systems may be trained from labelled training data (e.g., in supervised learning) or unlabeled data (e.g., in unsupervised learning).

Structural and syntactic machine learning is based on symbolic data structures such as strings, trees, graphs, arrays for pattern representation, and/or other structures. Such data structures may allow description of relations between elementary pattern components and may provide means for hierarchical models showing how complex patterns are built up from simpler parts. The recognition of an unknown pattern may be accomplished by comparing its symbolic representation with a number of predefined object models. In the structural approach, the comparison may be made by a symbolic match that computes a measure of similarity between the unknown input and a number of prototype models. In syntactic pattern recognition, a parser or error correcting parser may check an unknown input to identify whether or not it is in accordance with the rules of a grammar that describes all members of a pattern class.

A knowledge graph is a graph representation of knowledge and information. For example, a knowledge graph may be a graph representation of an abstraction of relationships among related entities. The entities in a knowledge graph may be represented by nodes and all the attributes of the entities are stored along with the nodes. Related nodes may be connected by directed or undirected edges. These edges may describe the relationships among those nodes or entities.

For example, the information "Person #1 lives in New York" may be represented by a knowledge graph having two nodes "Person #1" and "New York" with a directed edge connection node from "Person #1" to "New York" where the edge has the associated property describing the relationship "lives in."

In this regard, knowledge graphs may be used for inferencing. For example, the above described knowledge graph may be expanded to include another node "USA" with a directed edge connection between "New York" and "USA" that has the property "lives in." Accordingly, the knowledge graph may be used to infer that "Person #1 lives in USA."

Historically, statistical machine learning and syntactic machine learning have been pursued separately. However, purely statistical machine learning may demand a significant amount of data, which may be difficult to obtain. Even if the necessary amount of data is obtained, data may be inaccurate or mislabeled, which may lead to an unstable model and/or deteriorated prediction rate.

On the other hand, purely knowledge graph based syntactic methods may need to store so much symbolic information that the data load may become extremely large and computationally expensive.

In a hybrid approach both statistical and syntactic methods may be used together to reach a decision. For example, both statistical as well as syntactic machine learning methods may be used independently to make an inference. However, only one of the inferences from one of these methods may be returned as the final inference and the other result may be thrown away. In some instances, several statistical and syntactic methods might be used, each one independent from another, and only one of the inferences may ultimately be used.

There does not exist a systematic method to choose one method over the other. For example, confidence levels may be used to select a more accurate model, however, if the confidence levels of two different inferences are similar, there is no obvious solution to choose one over the other.

Choosing one inference over others may also reduce the value of information of hybrid inferencing methods since it utilizes the results of merely one computation, and disregards the other. Accordingly, the systems and methods described herein describe a solution to these technical problems, in which the inferences of both syntactic and statistical machine learning methods may be combined together so as to achieve the benefits of both methods. In doing so, the accuracy of such inferencing methods may be increased by incorporating the information and benefits of both syntactic and statistical machine learning methods.

Figure 1B:
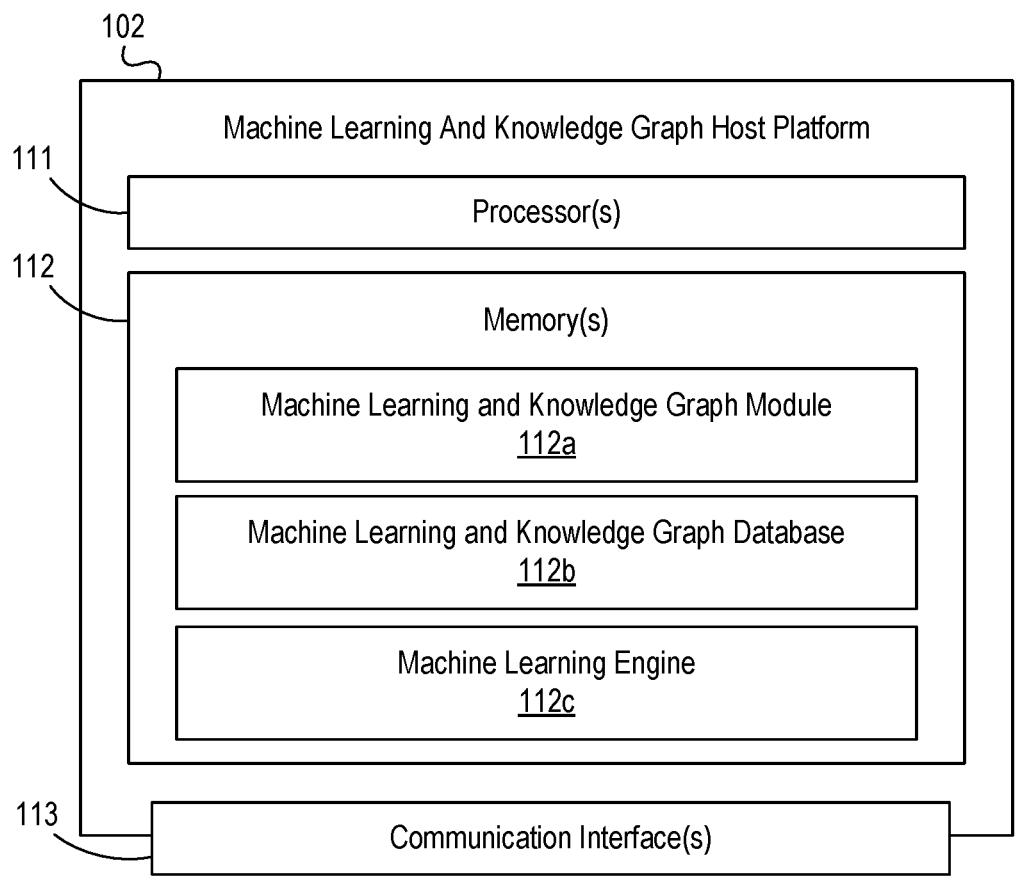

FIGS. 1A-1B depict an illustrative computing environment for correlating machine learning models and knowledge graphs for improved decision making in accordance with one or more example embodiments. Referring to FIG. 1A, computing environment 100 may include one or more computer systems. For example, computing environment 100 may include machine learning and knowledge graph host platform 102, enterprise data source 103, and enterprise computing device 104.

As described further below, machine learning and knowledge graph host platform 102 may be a computer system that includes one or more computing devices (e.g., servers, server blades, or the like) and/or other computer components (e.g., processors, memories, communication interfaces) that may be used to train, maintain, and implement machine learning models and/or knowledge graphs that may be applied and correlated for improved decision making.

Enterprise data source 103 may include one or more computing devices (e.g., servers, server blades, or the like) and/or other computer components (e.g., processors, memories, communication interfaces) that may be used to store data (e.g., labelled or unlabeled data) that may be used to train a machine learning model and/or generate a knowledge graph. In some instances, the enterprise data source 103 may be configured to communicate with the machine learning and knowledge graph host platform 102 for the purpose of sending the training data.

Enterprise computing device 104 may be a laptop computer, desktop computer, mobile device, tablet, smartphone, or the like that may be used by an employee or administrator of an enterprise organization (e.g., a financial institution, or the like). For example, the enterprise computing device 104 may be used by one or more individuals for event processing and/or otherwise accessing results produced by the machine learning and knowledge graph host platform 102. In some instances, enterprise computing device 104 may be configured to display one or more user interfaces (e.g., event processing, and/or other interfaces).

Computing environment 100 also may include one or more networks, which may interconnect machine learning and knowledge graph host platform 102, enterprise data source 103, and/or enterprise computing device 104. For example, computing environment 100 may include a network 101 (which may interconnect, e.g., machine learning and knowledge graph host platform 102, enterprise data source 103, and/or enterprise computing device 104).

In one or more arrangements, machine learning and knowledge graph host platform 102, enterprise data source 103, and/or enterprise computing device 104 may be any type of computing device capable of sending and/or receiving requests and processing the requests accordingly. For example, machine learning and knowledge graph host platform 102, enterprise data source 103, enterprise computing device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of machine learning and knowledge graph host platform 102, enterprise data source 103, and/or enterprise computing device 104, may, in some instances, be special-purpose computing devices configured to perform specific functions.

Referring to FIG. 1B, machine learning and knowledge graph host platform 102 may include one or more processors 111, memory 112, and communication interface 113. A data bus may interconnect processor 111, memory 112, and communication interface 113. Communication interface 113 may be a network interface configured to support communication between machine learning and knowledge graph host platform 102 and one or more networks (e.g., network 101, or the like). Memory 112 may include one or more program modules having instructions that when executed by processor 111 cause machine learning and knowledge graph host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of machine learning and knowledge graph host platform 102 and/or by different computing devices that may form and/or otherwise make up machine learning and knowledge graph host platform 102. For example, memory 112 may have, host, store, and/or include machine learning and knowledge graph module 112a, machine learning and knowledge graph database 112b, and machine learning engine 112c.

Machine learning and knowledge graph module 112a may have instructions that direct and/or cause machine learning and knowledge graph host platform 102 to execute advanced techniques to correlate machine learning models and knowledge graphs for improved decision making. Machine learning and knowledge graph database 112b may store information used by machine learning and knowledge graph module 112a and/or machine learning and knowledge graph host platform 102 in application of advanced machine learning techniques to correlate machine learning models and knowledge graphs for improved decision making, and/or in performing other functions. Machine learning engine 112c may have instructions that direct and/or cause the machine learning and knowledge graph host platform 102 to set, define, and/or iteratively refine optimization rules and/or other parameters used by the machine learning and knowledge graph host platform 102 and/or other systems in computing environment 100.

Figure 2A:
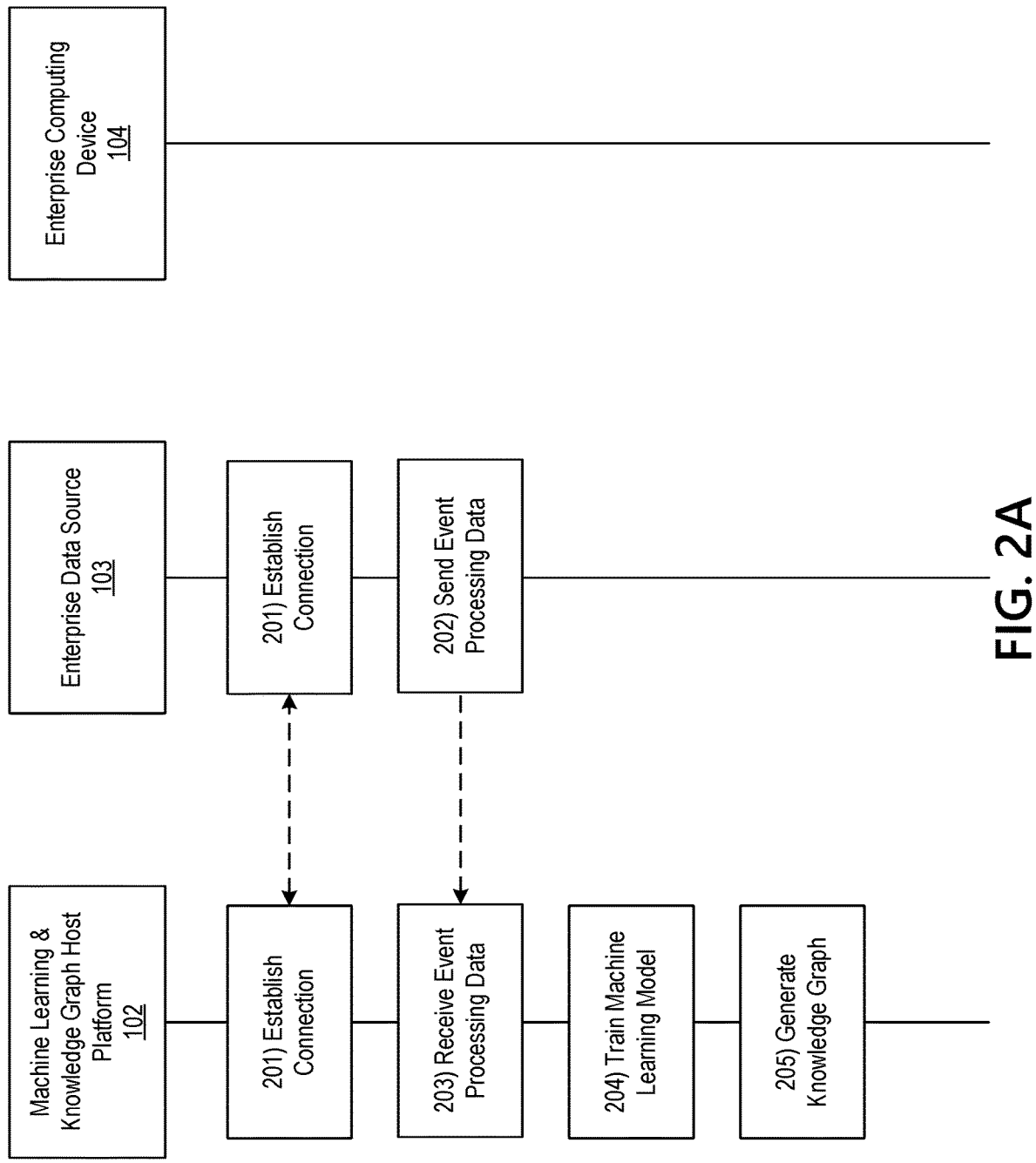

FIGS. 2A-2E depict an illustrative event sequence for correlating machine learning models and knowledge graphs for improved decision making in accordance with one or more example embodiments. Referring to FIG. 2A, at step 201, enterprise data source 103 may establish a wireless data connection with the machine learning and knowledge graph host platform 102. For example, the enterprise data source 103 may establish a first wireless data connection with the machine learning and knowledge graph host platform 102 to link the enterprise data source 103 to the machine learning and knowledge graph host platform 102 (e.g., in preparation for sending event processing data). In some instances, the enterprise data source 103 may identify whether or not a connection is already established with the machine learning and knowledge graph host platform 102. If a connection is already established with the machine learning and knowledge graph host platform 102, the enterprise data source 103 might not re-establish the connection. If a connection is not yet established with the machine learning and knowledge graph host platform 102, the enterprise data source 103 may establish the first wireless data connection as described herein.

At step 202, the enterprise data source 103 may send event processing data to the machine learning and knowledge graph host platform 102. For example, the enterprise data source 103 may send event processing data to the machine learning and knowledge graph host platform 102 while the first wireless data connection is established. In some instances, in sending the event processing data, the enterprise data source 103 may send data corresponding to historical event processing (e.g., transactions amounts, account information, and/or other historical processing information).

At step 203, the machine learning and knowledge graph host platform 102 may receive the event processing data sent at step 202. For example, the machine learning and knowledge graph host platform 102 may receive the event processing data via the communication interface 113 and while the first wireless data connection is established.

At step 204, the machine learning and knowledge graph host platform 102 may train a machine learning model (e.g., a supervised machine learning model, unsupervised learning model, and/or combination of models). For example, the machine learning and knowledge graph host platform 102 may train the machine learning model, using the historical event processing data received at step 203, to solve various event processing requests (e.g., distinguish between questionable, maybe questionable, and valid transactions, and/or identify a corresponding account, transaction number, payor, payee, payment amount, date, enterprise, and/or other information corresponding to previously processed events). In doing so, the machine learning and knowledge graph host platform 102 may generate various data clusters, each corresponding to various event processing data (e.g., a cluster of transactions corresponding a particular account, and/or otherwise that share a particular property). As another example, the machine learning and knowledge graph host platform 102 may distinguish between a questionable, maybe questionable, or not questionable (e.g., valid) transaction. This may enable the machine learning and knowledge graph host platform 102 to group similar data together, which may enable labeling future data and/or otherwise outputting a data response based on future data by associating it with a particular cluster.

At step 205, the model generation and knowledge graph host platform 102 may generate a knowledge graph using the historical event processing data. For example, the model generation and knowledge graph host platform 102 may generate nodes and relationships between the generated nodes to represent the historical event processing data. As a particular example, if a particular data point of the historical event processing data indicates that $50 were transmitted from "Account #1" to "Account #2," nodes may be generated to represent each account, and an edge may connect the two nodes that is stored with the property "transmitted $50 to," flowing from the "Account #1" node to the "Account #2" node. In some instances, in generating the knowledge graph, the model generation and knowledge graph host platform 102 may generate a knowledge graph that includes the same information that is stored in the machine learning model that was trained at step 204.

In some instances, the machine learning and knowledge graph host platform 102 may enhance the knowledge graph by creating clusters (e.g., using a depth first search method that checks off all nodes reached within a threshold number of hops). By creating such clusters, the machine learning and knowledge graph host platform 102 may enable correlation of information stored in the machine learning model and the knowledge graph.

Figure 2B:
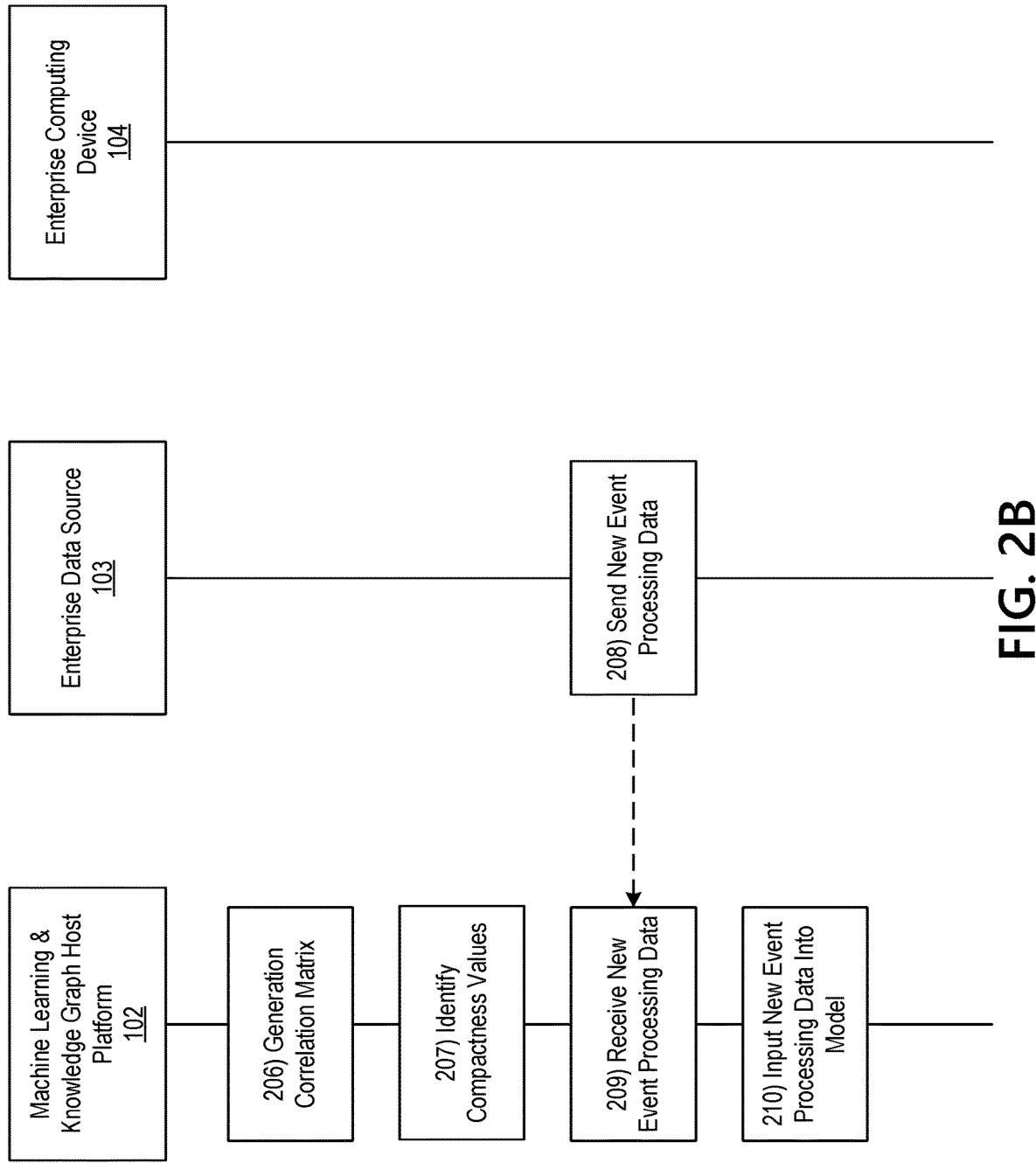

Referring to FIG. 2B, at step 206, the machine learning and knowledge graph host platform 102 may generate a correlation matrix to relate data nodes on the knowledge graph (e.g., generated at step 205) with data points in the machine learning model (e.g., generated at step 204). For example, the machine learning and knowledge graph host platform 102 may generate a correlation matrix that indicates which data points (in the machine learning model) correspond to which data nodes (in the knowledge graph). For example, the machine learning and knowledge graph host platform 102 may store the same data in the machine learning model and the knowledge graph, and may generate the correlation matrix to maintain correlations between the two different representations of the same data (e.g., the machine learning representation and the knowledge graph representation of a particular data point).

More specifically, the machine learning and knowledge graph host platform 102 may perform a statistical calculation based on the data points in the machine learning model and the data nodes in the machine learning model to express a relationship between the historical event processing data as represented in these two different forms (e.g., machine learning and knowledge graph). In doing so, the machine learning and knowledge graph host platform 102 may identify a value between −1 and 1, where 1 indicates a perfect positive relationship between two clusters (a machine learning cluster and a knowledge graph cluster) while −1 indicates a perfect negative relationship between the two clusters (a machine learning cluster and a knowledge graph cluster) (0 indicates that two data sets are not correlated).

As a particular example, the machine learning and knowledge graph host platform 102 may apply Pearson's formula to compute the correlation coefficients $$\left(e.g., \text{correlation coefficient} = \frac{\text{Covariance}(A, B)}{(StdDev(A) * StdDev(B))}\right),$$

where A and B are corresponding clusters of the machine learning model and the knowledge graph respectively). After computing these correlation coefficients between clusters of the machine learning model and clusters of the knowledge graph, the machine learning and knowledge graph host platform 102 may store the correlation coefficients in the correlation matrix. For example, the machine learning data points may represent the y axis and the knowledge graph nodes may represent the x axis, with the correlation coefficients filling in the intersections of corresponding machine learning data points and knowledge graph nodes.

At step 207, the machine learning and knowledge graph host platform 102 may identify compactness values for the machine learning model and the knowledge graph. For example, the machine learning and knowledge graph host platform 102 may use compactness to define how well clustered and/or compacted clusters in both the machine learning model and the knowledge graph are. For example, if the machine learning and knowledge graph host platform 102 identifies that the clusters do not have well defined boundaries and are scattered, the machine learning and knowledge graph host platform 102 may identify the corresponding knowledge graph and/or machine learning model as an inaccurate model.

For the machine learning model, the machine learning and knowledge graph host platform 102 may compute a compactness value by taking a sum of the area of the convex hull of each cluster, and divide this sum by the total area of all the clusters. In these instances, the machine learning and knowledge graph host platform 102 may then assign a compactness value equivalent to the result. Additionally or alternatively, the machine learning and knowledge graph host platform 102 may identify whether or not entropy of the machine learning clusters exceeds a predetermined entropy threshold, and may assign a compactness value accordingly (e.g., if not exceeded, value=0.3; if equal to threshold, value=0.5; if exceeded, value=1). Additionally or alternatively, the machine learning and knowledge graph host platform 102 may identify an average Euclidian distance between data points and the center of their corresponding data cluster, compare the average distance to a plurality of threshold distances, and assign a corresponding compactness value based on the comparison.

With regard to the knowledge graph, the machine learning and knowledge graph host platform 102 may identify the maximum topological distances of each cluster (e.g., measured in hops or nodes), and may divide these distances by the largest path of the entire knowledge graph to identify compactness of each cluster. Additionally or alternatively, the machine learning and knowledge graph host platform 102 may identify an average number of hops or edges between data nodes of the data nodes to a center of a corresponding cluster, compare the distance to a plurality of threshold distances, and assign a corresponding compactness value based on the comparison.

At step 208, the enterprise data source 103 may send new event processing data to the machine learning and knowledge graph host platform 102. For example, the enterprise data source 103 may send new event processing data to the machine learning and knowledge graph host platform 102 while the first wireless data connection is established. In some instances, in sending the new event processing data, the enterprise data source 103 may send data/information similar to the historical event processing data sent at step 202.

At step 209, the machine learning and knowledge graph host platform 102 may receive the new event processing data sent at step 208. For example, the machine learning and knowledge graph host platform 102 may receive the new event processing data via the communication interface 113 and while the first wireless data connection is established.

At step 210, the machine learning and knowledge graph host platform 102 may input the new event processing data (received at step 209) into the machine learning model. In some instances, in inputting the new event processing data into the machine learning model, the machine learning and knowledge graph host platform 102 may identify k nearest neighbor data points (e.g., of the historical event processing data stored in the machine learning model) closest to the data point corresponding to the new event processing data. For example, the machine learning and knowledge graph host platform 102 may identify a Euclidian distance between the data point corresponding to the new event processing data and the data points corresponding to the historical event processing data. The machine learning and knowledge graph host platform 102 may then rank the Euclidian distances from smallest to largest, select the k smallest distances, and identify the data points corresponding to these k smallest distances. Although a Euclidian distance is described herein, other metrics such as the Manhattan metric, L-Infinity metric, and/or other metrics may be applied without departing from the scope of the disclosure.

Referring to FIG. 2C, at step 211, the machine learning and knowledge graph host platform 102 may input the new event processing data (e.g., that was input into the machine learning model at step 210) into the knowledge graph. In some instances, in inputting the new event processing data into the knowledge graph, the machine learning and knowledge graph host platform 102 may identify k nearest neighbor data nodes (e.g., of the historical event processing data stored in the knowledge graph) closest to the data node corresponding to the new event processing data. For example, the machine learning and knowledge graph host platform 102 may identify a number of hops and/or edges between the data node corresponding to the new event processing data and the data nodes corresponding to the historical event processing data (e.g., a number of data nodes between the data node corresponding to the new event processing data and a particular cluster corresponding to the historical event processing data). The machine learning and knowledge graph host platform 102 may then rank the hop distances from smallest to largest, select the k smallest distances, and identify the data nodes corresponding to these k smallest distances.

At step 212, the machine learning and knowledge graph host platform 102 may use the correlation matrix (generated at step 206) to identify correlation values corresponding to the k nearest data points and/or data nodes. At step 213, the machine learning and knowledge graph host platform 102 may compute relative weighted distances between the new event processing data/node and the k nearest data points and/or data nodes. To do so for the machine learning model, the machine learning and knowledge graph host platform 102 may define the relative distances as Euclidian distances between the new event processing data and the k nearest data points divided by the corresponding confidence values. With regard to the knowledge graph clusters, the machine learning and knowledge graph host platform 102 may define the relative distances as the hop distances between the new event processing node and the k nearest data nodes divided by the corresponding confidence values. This may result in ratios that may be comparable as relative distances (e.g., distance ratios based on corresponding cluster sizes).

At step 214, the machine learning and knowledge graph host platform 102 may divide the relative weighted distances, computed at step 213, by the corresponding compactness values identified at step 207. In doing so, the machine learning and knowledge graph host platform 102 may generate comparable distance ratios between the machine learning model and the knowledge graph. In some instances, the machine learning and knowledge graph host platform 102 may rank these adjusted relative weighted distances from smallest to largest and identify the smallest adjusted relative weighted distance.

Figure 2D:
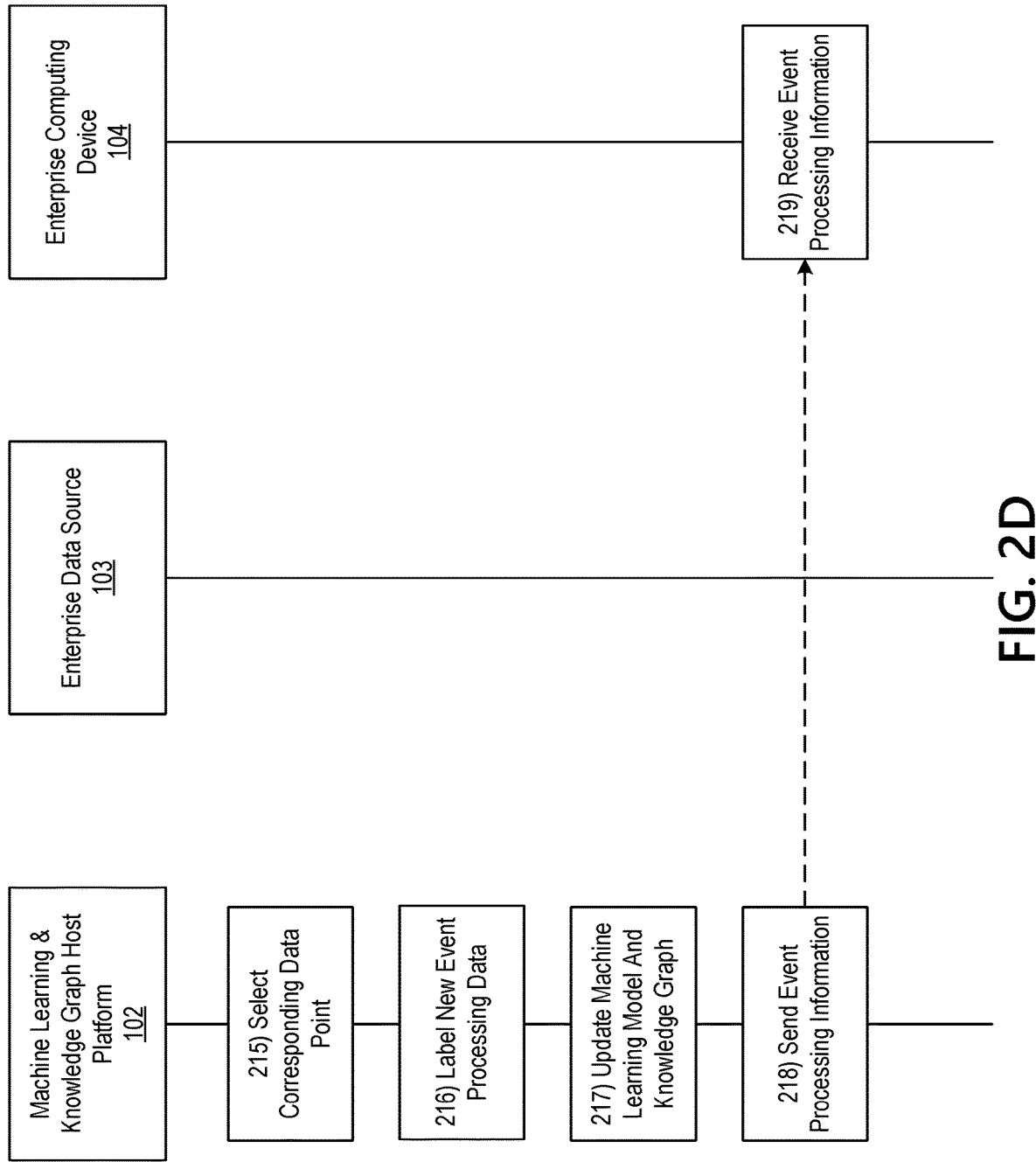

Referring to FIG. 2D, at step 215, the machine learning and knowledge graph host platform 102 may select a data point and/or data node with the smallest compacted relative weighted distance (e.g., based on the computations from step 214), and may identify that the new event processing data should be labelled based on a cluster corresponding to the selected data point and/or data node. Additionally or alternatively, the machine learning and knowledge graph host platform 102 may poll the k nearest data points and/or data nodes to identify a cluster corresponding to a majority (or some other threshold number) of the k nearest data points and/or data nodes. In these instances, the machine learning and knowledge graph host platform 102 may identify that the new event processing data should be labelled based on the identified cluster.

In doing so, the machine learning and knowledge graph host platform 102 may increase accuracy of the automated prediction making described above. For example, rather than sending decisions from each of the machine learning model and the knowledge graph to a decision engine, and having the decision engine select one of the two decisions based on confidence values, the machine learning and knowledge graph host platform 102 effectively applies a unique resolution process that makes a predictive decision based on correlations between the machine learning model and the knowledge graph, as well as the distance of a given point from each of the clusters that exist in both the machine learning model and the knowledge graph.

At step 216, the machine learning and knowledge graph host platform 102 may label the new event processing data based on the selected data point/data node and its corresponding cluster (e.g., label a corresponding account, payor, payee, transaction amount, and/or other event processing information). Additionally or alternatively, the machine learning and knowledge graph host platform 102 may use the method described to label a particular event as a questionable, maybe questionable, or not questionable (e.g., valid) transaction.

At step 217, the machine learning and knowledge graph host platform 102 may update the machine learning model and/or knowledge graph based on the labelled new event processing data. At step 218, machine learning and knowledge graph host platform 102 may send event processing information, indicating the labelled new event processing data, to the enterprise computing device 104. For example the machine learning and knowledge graph host platform 102 may establish a second wireless data connection with the enterprise computing device 104 to link the machine learning and knowledge graph host platform 102 to the enterprise computing device 104 (e.g., in preparation for sending the event processing information). In some instances, the machine learning and knowledge graph host platform 102 may identify whether or not a connection is already established with the enterprise computing device 104. If a connection is already established with the enterprise computing device 104, the machine learning and knowledge graph host platform 102 might not re-establish the connection. If a connection is not yet established with the enterprise computing device 104, the machine learning and knowledge graph host platform 102 may establish the second wireless data connection as described herein.

Accordingly, the machine learning and knowledge graph host platform 102 may send event processing information to the enterprise computing device 104 via the communication interface 113 and while the second wireless data connection is established. In some instances, along with the event processing information, the machine learning and knowledge graph host platform 102 may send one or more commands directing the enterprise computing device 104 to display the event processing information.

At step 219, the enterprise computing device 104 may receive the event processing information sent at step 218. For example, the enterprise computing device 104 may receive the event processing information while the second wireless data connection is established. In some instances, the enterprise computing device 104 may also receive the one or more commands directing the enterprise computing device 104 to display the event processing information.

Figure 4:
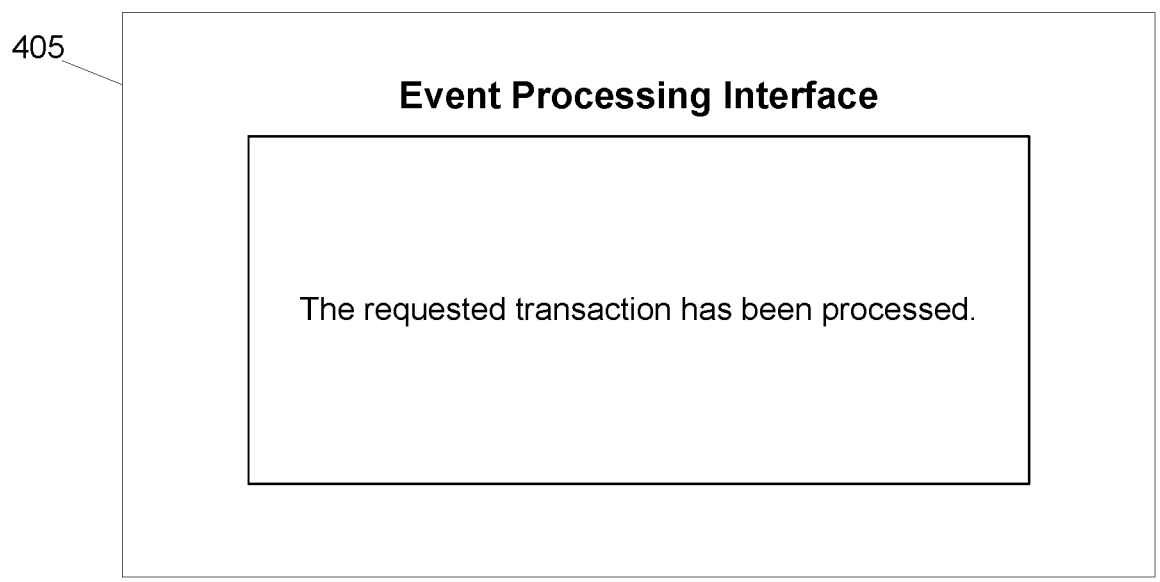
FIG. 4 depicts an illustrative graphical user interface for correlating machine learning models and knowledge graphs for improved decision making in accordance with one or more example embodiments.

Referring to FIG. 2E, at step 220, based on or in response to the one or more commands directing the enterprise computing device 104 to display the event processing information, the enterprise computing device 104 may display the event processing information. For example, the enterprise computing device 104 may display a graphical user interface similar to graphical user interface 405, which is illustrated in FIG. 4.

Figure 3:
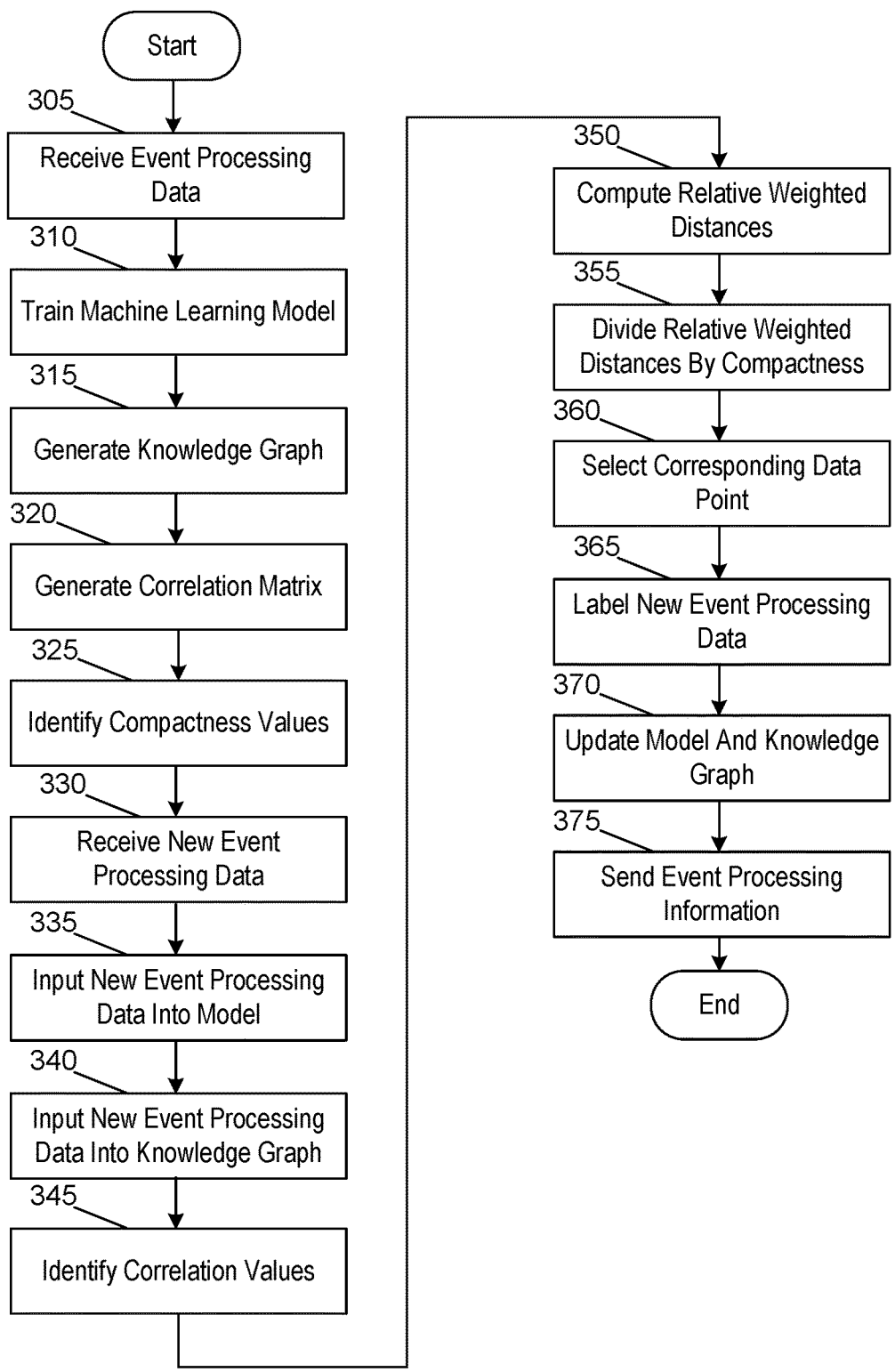
FIG. 3 depicts an illustrative method for correlating machine learning models and knowledge graphs for improved decision making in accordance with one or more example embodiments.

FIG. 3 depicts an illustrative method for correlating machine learning models and knowledge graphs for improved decision making in accordance with one or more example embodiments. Referring to FIG. 3, at step 305, a computing platform having at least one processor, a communication interface, and memory may receive historical event processing data. At step 310, the computing platform may train the machine learning model using the historical event processing data. At step 315, the computing platform may generate a knowledge graph using the historical event processing data. At step 320, the computing platform may generate a correlation matrix to relate the knowledge graph and the machine learning model. At step 325, the computing platform may identify compactness values for the machine learning model and the knowledge graph. At step 330, the computing platform may receive new event processing data. At step 335, the computing platform may input the new event processing data into the machine learning model. At step 340, the computing platform may input the new event processing data into the knowledge graph. At step 345, the computing platform may use the correlation matrix to identify correlation values between results of inputting the new event processing data into the machine learning model and the knowledge graph. At step 350, the computing platform may compute relative weighted distances corresponding to the results. At step 355, the computing platform may divide the relative weighted distances by the compactness values. At step 360, the computing platform may select a corresponding data point for the event processing data. At step 365, the computing platform may label the new event processing data based on the corresponding data point. At step 370, the computing platform may update the machine learning model and the knowledge graph based on the labelled event processing data. At step 375, the computing platform may send event processing information, based on the labelled event processing data, to an enterprise computing device for display.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical event processing data, a machine learning model, wherein training the machine learning model comprises clustering the historical event processing data based on common characteristics, and wherein training the machine learning model configures the machine learning model to cluster input data and label the input data based on the corresponding cluster;
   generate, using the historical event processing data, a knowledge graph, wherein generating the knowledge graph comprises using a depth first search method to create graph clusters configured to generate correlations between information stored in the machine learning model and additional information stored in the knowledge graph;
   generate a correlation matrix, wherein the correlation matrix includes correlation values between Euclidian distances between data points of the machine learning model and hop distances between nodes of the knowledge graph;
   receive new event processing data;
   identify, using the machine learning model, k nearest data points corresponding to the new event processing data;
   identify, using the knowledge graph, k nearest data nodes corresponding to the new event processing data;
   generate, using the correlation values, first weighted relative distances between the new event processing data and the k nearest data points;
   generate, using the correlation values, second weighted relative distances between the new event processing data and the k nearest data nodes;
   identify, based on the first weighted relative distances and the second weighted relative distances, a data cluster for the new event processing data;
   send, based on the identified data cluster, event processing information and one or more commands directing an enterprise computing device to display the event processing information, wherein sending the one or more commands directing the enterprise computing device to display the event processing information causes the enterprise computing device to display the event processing information; and
   update, based on the identified data cluster and the new event processing data, the machine learning model and the knowledge graph.

2. The computing platform of claim 1, wherein the memory stores additional computer-readable instructions that, when executed by the at least one processor, cause the computing platform to:
   identify the k nearest data points, wherein identifying the k nearest data points comprises:
   inputting, into the machine learning model, the new event processing data,
   identifying, using the machine learning model, Euclidian distances between the new event processing data and the historical event processing data,
   ranking the Euclidian distances from smallest to largest,
   identifying the k smallest Euclidian distances, and
   identifying the historical event processing data corresponding to the k smallest Euclidian distances.

3. The computing platform of claim 2, wherein generating the first weighted relative distances between the new event processing data and the k nearest data points comprises:
   identifying, using the correlation matrix, the correlation values corresponding to the k nearest data points; and
   multiplying each of the k smallest Euclidian distances by the corresponding correlation values.

4. The computing platform of claim 1, wherein the memory stores additional computer-readable instructions that, when executed by the at least one processor, cause the computing platform to:
   identify the k nearest data nodes, wherein identifying the k nearest data nodes comprises:
   inputting, into the knowledge graph, the new event processing data,
   identifying, using the knowledge graph, a number of hops between the new event processing data and the historical event processing data,
   ranking the numbers of hops from smallest to largest,
   identifying the k smallest hop distances, and
   identifying the historical event processing data corresponding to the k smallest hop distances.

5. The computing platform of claim 4, wherein generating the second weighted relative distances between the new event processing data and the k nearest data nodes comprises:
   identifying, using the correlation matrix, the correlation values corresponding to the k nearest data nodes; and
   multiplying each of the k smallest hop distances by the corresponding correlation values.

6. The computing platform of claim 1, wherein the memory stores additional computer-readable instructions that, when executed by the at least one processor, cause the computing platform to:

identify a first compactness value for the machine learning model and a second compactness value for the knowledge graph, wherein:
identifying the first compactness value comprises:
identifying an average Euclidian distance between data points of the machine learning model and a center of a corresponding data cluster, and
identifying, based on the average Euclidian distance, the first compactness value; and
identifying the second compactness value comprises:
identifying an average number of hops between data nodes of the knowledge graph and a center of a corresponding data cluster, and
identifying, based on the average number of hops, the second compactness value.

7. The computing platform of claim 6, wherein identifying the data cluster for the new event processing data comprises:
dividing the first weighted relative distances by the first compactness value, resulting in adjusted first weighted relative distances;
dividing the second weighted relative distances by the second compactness value, resulting in adjusted second weighted relative distances;
generating a ranking list that includes the adjusted first weighted relative distances and the adjusted second weighted relative distances;
identifying the smallest adjusted weighted relative distance; and
identifying one of:
a data point from the machine learning model, or
a data node from the knowledge graph corresponding to the smallest adjusted weighted relative distance.

8. A method comprising:
at a computing platform comprising at least one processor, a communication interface, and memory:
training, using historical event processing data, a machine learning model, wherein training the machine learning model comprises clustering the historical event processing data based on common characteristics, and wherein training the machine learning model configures the machine learning model to cluster input data and label the input data based on the corresponding cluster;
generating, using the historical event processing data, a knowledge graph, wherein generating the knowledge graph comprises using a depth first search method to create graph clusters configured to generate correlations between information stored in the machine learning model and additional information stored in the knowledge graph;
generating a correlation matrix, wherein the correlation matrix includes correlation values between Euclidian distances between data points of the machine learning model and hop distances between nodes of the knowledge graph;
receiving, by the at least one processor, new event processing data;
identifying, by the at least one processor and using the machine learning model, k nearest data points corresponding to the new event processing data;
identifying, by the at least one processor and using the knowledge graph, k nearest data nodes corresponding to the new event processing data;
generating, by the at least one processor and using the correlation values, first weighted relative distances between the new event processing data and the k nearest data points;
generating, by the at least one processor and using the correlation values, second weighted relative distances between the new event processing data and the k nearest data nodes;
identifying, by the at least one processor and based on the first weighted relative distances and the second weighted relative distances, a data cluster for the new event processing data;
sending, by the at least one processor and based on the identified data cluster, event processing information and one or more commands directing an enterprise computing device to display the event processing information, wherein sending the one or more commands directing the enterprise computing device to display the event processing information causes the enterprise computing device to display the event processing information; and
update, based on the identified data cluster and the new event processing data, the machine learning model and the knowledge graph.

9. The method of claim 8, further comprising:
identifying, by the at least one processor, the k nearest data points, wherein identifying the k nearest data points comprises:
inputting, by the at least one processor and into the machine learning model, the new event processing data,
identifying, by the at least one processor and using the machine learning model, Euclidian distances between the new event processing data and the historical event processing data,
ranking, by the at least one processor, the Euclidian distances from smallest to largest,
identifying, by the at least one processor, the k smallest Euclidian distances, and
identifying, by the at least one processor, the historical event processing data corresponding to the k smallest Euclidian distances.

10. The method of claim 9, wherein generating the first weighted relative distances between the new event processing data and the k nearest data points comprises:
identifying, by the at least one processor and using the correlation matrix, the correlation values corresponding to the k nearest data points; and
multiplying, by the at least one processor, each of the k smallest Euclidian distances by the corresponding correlation values.

11. The method of claim 8, further comprising:
identifying, by the at least one processor, the k nearest data nodes, wherein identifying the k nearest data nodes comprises:
inputting, by the at least one processor and into the knowledge graph, the new event processing data,
identifying, by the at least one processor and using the knowledge graph, a number of hops between the new event processing data and the historical event processing data,
ranking, by the at least one processor, the numbers of hops from smallest to largest,
identifying, by the at least one processor, the k smallest hop distances, and identifying, by the at least one processor, the historical event processing data corresponding to the k smallest hop distances.

12. The method of claim 11, wherein generating the second weighted relative distances between the new event processing data and the k nearest data nodes comprises:
identifying, by the at least one processor and using the correlation matrix, the correlation values corresponding to the k nearest data nodes; and
multiplying, by the at least one processor, each of the k smallest hop distances by the corresponding correlation values.

13. The method of claim 8, further comprising:
identifying, by the at least one processor, a first compactness value for the machine learning model and a second compactness value for the knowledge graph, wherein:
identifying, by the at least one processor, the first compactness value comprises:
identifying, by the at least one processor, an average Euclidian distance between data points of the machine learning model and a center of a corresponding data cluster, and
identifying, by the at least one processor and based on the average Euclidian distance, the first compactness value; and
identifying, by the at least one processor, the second compactness value comprises:
identifying, by the at least one processor, an average number of hops between data nodes of the knowledge graph and a center of a corresponding data cluster, and
identifying, by the at least one processor and based on the average number of hops, the second compactness value.

14. The method of claim 13, wherein identifying the data cluster for the new event processing data comprises:
dividing, by the at least one processor, the first weighted relative distances by the first compactness value, resulting in adjusted first weighted relative distances;
dividing, by the at least one processor, the second weighted relative distances by the second compactness value, resulting in adjusted second weighted relative distances;
generating, by the at least one processor, a ranking list that includes the adjusted first weighted relative distances and the adjusted second weighted relative distances;
identifying, by the at least one processor, the smallest adjusted weighted relative distance; and
identifying, by the at least one processor, one of:
a data point from the machine learning model, or
a data node from the knowledge graph corresponding to the smallest adjusted weighted relative distance.

15. One or more non-transitory computer-readable media storing instructions that, when executed by a computing platform comprising at least one processor, a communication interface, and memory, cause the computing platform to:
train, using historical event processing data, a machine learning model, wherein training the machine learning model comprises clustering the historical event processing data based on common characteristics, and wherein training the machine learning model configures the machine learning model to cluster input data and label the input data based on the corresponding cluster;
generate, using the historical event processing data, a knowledge graph, wherein generating the knowledge graph comprises using a depth first search method to create graph clusters configured to generate correlations between information stored in the machine learning model and additional information stored in the knowledge graph;
generate a correlation matrix, wherein the correlation matrix includes correlation values between Euclidian distances between data points of the machine learning model and hop distances between nodes of the knowledge graph;
receive new event processing data;
identify, using the machine learning model, k nearest data points corresponding to the new event processing data;
identify, using the knowledge graph, k nearest data nodes corresponding to the new event processing data;
generate, using the correlation values, first weighted relative distances between the new event processing data and the k nearest data points;
generate, using the correlation values, second weighted relative distances between the new event processing data and the k nearest data nodes;
identify, based on the first weighted relative distances and the second weighted relative distances, a data cluster for the new event processing data;
send, based on the identified data cluster, event processing information and one or more commands directing an enterprise computing device to display the event processing information, wherein sending the one or more commands directing the enterprise computing device to display the event processing information causes the enterprise computing device to display the event processing information; and
update, based on the identified data cluster and the new event processing data, the machine learning model and the knowledge graph.

16. The computing platform of claim 1, wherein the memory stores additional computer-readable instructions that, when executed by the at least one processor, cause the computing platform to:
generate correlation coefficients, wherein generating each correlation coefficient comprises applying the following formula: correlation coefficient=covariance (A,B)/(standard deviation(A)*standard deviation(B)), wherein A represents a first cluster of the machine learning model, and B represents a second cluster of the knowledge graph, wherein the first cluster corresponds to the second cluster.

17. The non-transitory computer-readable media of claim 15, wherein the memory stores additional computer-readable instructions that, when executed by the at least one processor, cause the computing platform to:
identify the k nearest data points, wherein identifying the k nearest data points comprises:
inputting, into the machine learning model, the new event processing data,
identifying, using the machine learning model, Euclidian distances between the new event processing data and the historical event processing data,
ranking the Euclidian distances from smallest to largest,
identifying the k smallest Euclidian distances, and
identifying the historical event processing data corresponding to the k smallest Euclidian distances.

18. The non-transitory computer-readable media of claim 17, wherein generating the first weighted relative distances between the new event processing data and the k nearest data points comprises:

identifying, using the correlation matrix, the correlation values corresponding to the k nearest data points; and
multiplying each of the k smallest Euclidian distances by the corresponding correlation values.

19. The non-transitory computer-readable media of claim 15, wherein the memory stores additional computer-readable instructions that, when executed by the at least one processor, cause the computing platform to:
identify the k nearest data nodes, wherein identifying the k nearest data nodes comprises:
inputting, into the knowledge graph, the new event processing data,
identifying, using the knowledge graph, a number of hops between the new event processing data and the historical event processing data,
ranking the numbers of hops from smallest to largest,
identifying the k smallest hop distances, and
identifying the historical event processing data corresponding to the k smallest hop distances.

20. The non-transitory computer-readable media of claim 19, wherein generating the second weighted relative distances between the new event processing data and the k nearest data nodes comprises:
identifying, using the correlation matrix, the correlation values corresponding to the k nearest data nodes; and
multiplying each of the k smallest hop distances by the corresponding correlation values.

* * * * *